(12) United States Patent
Jiang et al.

(10) Patent No.: US 9,955,497 B2
(45) Date of Patent: Apr. 24, 2018

(54) LOW LATENCY UPLINK ACKNOWLEDGEMENT CHANNEL WAVEFORM DESIGN

(71) Applicant: QUALCOMM Incorporated, San Diego, CA (US)

(72) Inventors: Jing Jiang, San Diego, CA (US); Joseph Binamira Soriaga, San Diego, CA (US); Tingfang Ji, San Diego, CA (US); John Edward Smee, San Diego, CA (US); Peter Gaal, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 218 days.

(21) Appl. No.: 14/942,183

(22) Filed: Nov. 16, 2015

(65) Prior Publication Data

US 2016/0270109 A1    Sep. 15, 2016

Related U.S. Application Data

(60) Provisional application No. 62/133,271, filed on Mar. 13, 2015.

(51) Int. Cl.
*H04W 72/12* (2009.01)
*H04L 5/00* (2006.01)
*H04L 1/18* (2006.01)
*H04L 1/00* (2006.01)

(52) U.S. Cl.
CPC ....... *H04W 72/1268* (2013.01); *H04L 1/0026* (2013.01); *H04L 1/1854* (2013.01); *H04L 1/1861* (2013.01); *H04L 5/0005* (2013.01); *H04L 5/0051* (2013.01);
(Continued)

(58) Field of Classification Search
None
See application file for complete search history.

(56) References Cited

U.S. PATENT DOCUMENTS

2007/0183384 A1*  8/2007  Kwak .................. H04L 5/0055
                                                            370/338
2011/0242990 A1   10/2011  Simonsson et al.
(Continued)

OTHER PUBLICATIONS

ISA/EP, International Search Report and Written Opinion of the International Searching Authority, Int'l. App. No. PCT/US2016/018666, May 18, 2016, European Patent Office, Rijswijk, NL, 14 pgs.
(Continued)

*Primary Examiner* — Christine Duong
(74) *Attorney, Agent, or Firm* — Holland & Hart/Qualcomm

(57) ABSTRACT

Method, systems, and devices are described for low latency, robust acknowledgement reporting in a wireless communication system. A receiving device may receive a transmission in the transmission time interval (TTI), the transmission may include one or a plurality of symbols. The receiving device may identify an uplink acknowledgement channel configuration based on the format of the TTI. The receiving device may send an acknowledgement message to the sending device on the uplink acknowledgement channel according to the uplink acknowledgement channel configuration.

28 Claims, 12 Drawing Sheets

(52) U.S. Cl.
CPC ....... *H04L 5/0055* (2013.01); *H04W 72/1284* (2013.01); *H04W 72/1289* (2013.01); *H04L 1/0009* (2013.01)

(56) References Cited

U.S. PATENT DOCUMENTS

| | | | |
|---|---|---|---|
| 2011/0286391 A1* | 11/2011 | Chen | H04W 52/265 370/328 |
| 2012/0281675 A1 | 11/2012 | Liang et al. | |
| 2014/0269451 A1* | 9/2014 | Papasakellariou | H04B 7/2656 370/280 |
| 2014/0269452 A1* | 9/2014 | Papasakellariou | H04B 7/2643 370/280 |

OTHER PUBLICATIONS

Myung et al., "Channel-Dependent Scheduling of an Uplink SC-FDMA System with Imperfect Channel Information," 2008 IEEE Wireless Communications and Networking Conference, Las Vegas, NV, Mar. 31-Apr. 3, 2008, pp. 1860-1864, XP_31243916A, ISSN 1525-3511, Institute of Electrical and Electronics Engineers.

\* cited by examiner

LOW LATENCY UPLINK ACKNOWLEDGEMENT CHANNEL WAVEFORM DESIGN

CROSS REFERENCES

The present Application for Patent claims priority to U.S. Provisional Patent Application No. 62/133,271 by Jiang et al., entitled "Low Latency Uplink Acknowledgement Channel Waveform Design," filed Mar. 13, 2015, assigned to the assignee hereof.

BACKGROUND

Field of the Disclosure

The present disclosure, for example, relates to wireless communication systems, and more particularly to techniques for robust and low latency uplink acknowledgement channel design.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipments (UEs). A base station may communicate with UEs on downlink channels (e.g., for transmissions from a base station to a UE) and uplink channels (e.g., for transmissions from a UE to a base station).

Wireless communication systems often utilize retransmission procedures to provide error detect and correct functionality. For example, a receiving device (a UE or base station) may receive a transmission, confirm that a transport block is decoded without errors, and then send an acknowledgement (ACK) message to the sending device (a base station or UE) confirming successful decoding of the transport block. If errors are detected, the receiving device sends a negative-acknowledgement (NACK) to the sending device, which initiates a retransmission procedure. The ACK/NACK messages are typically sent via a dedicated channel from the receiving device to the transmitting device, e.g., via a physical hybrid automatic repeat request (HARM) indicator channel (PHICH), a physical uplink control channel (PUCCH), etc. Conventional communication systems may not consider latency issues when communicating the ACK/NACK information and may not provide for robustness in the ACK/NACK transmissions.

SUMMARY

The described features generally relate to one or more improved systems, methods, and/or apparatuses for acknowledgement channel configuration designs in a wireless communication system. Certain aspects of the present description employ various techniques for a receiving device to determine the configuration for the ACK/NACK transmissions that address latency concerns for high priority transmissions (e.g., mission critical transmissions that are time sensitive) as well as provide robustness for the ACK/NACK transmissions. For example, a receiving device may receive a transmission in a transmission time interval (TTI). The receiving device may identify, or otherwise determine, an uplink (UL) ACK channel configuration based on the format of the TTI, e.g., the number of symbols included in the TTI, the priority of the transmission in the TTI, etc. Accordingly, the receiving device may send an ACK message (or NACK message when errors are detected) to the sending device via an UL ACK channel according to the identified UL ACK channel configuration. The ACK message may be sent, in some aspects, sooner than conventional ACK message transmissions, and/or may be sent in a manner that provides improved robustness for the ACK transmission.

In a first illustrative set of examples, a method for wireless communication is described. The method may include: receiving a transmission in a transmission time interval (TTI); identifying an UL ACK channel configuration based at least in part on a format of the TTI; and sending an ACK message via an UL ACK channel according to the identified UL ACK channel configuration.

In some examples, the format of the TTI may include a plurality of symbols for the transmission. The method may include: decoding a first symbol of the plurality of symbols in the transmission in the TTI; and scheduling at least a portion of a resource associated with conveying the ACK message prior to decoding a second symbol of the plurality of symbols in the transmission in the TTI. The method may include utilizing the resource to send at least a portion of the ACK message prior to receiving each of the symbols of the plurality of symbols in the transmission.

In some examples, at least a portion of the ACK message may include at least pilot information, or channel space feedback information, or ACK/NACK information, or a combination thereof. The method may include sending the ACK message in more than one symbol in a subsequent TTI. The method may include selecting an interleaved frequency division multiple access (iFDMA) waveform for the UL ACK channel configuration. The method may include determining that the transmission in the TTI is associated with a high priority communication.

In some examples, the format of the TTI may include one symbol. The method may include: selecting an iFDMA waveform for the UL ACK channel configuration; and sending the ACK message via the UL ACK channel using the iFDMA waveform. The method may include: identifying a communication metric associated with the ACK message; and selecting a non-zero tone value for the iFDMA waveform based at least in part on the communication metric, the non-zero tone value corresponding to a number of non-zero tones within a predetermined number of tones of the iFDMA waveform.

In some examples, the iFDMA waveform may be multiplexed with one or more other iFDMA waveforms to capture orthogonality and spectrum efficiency. The communication metric may include at least a latency attribute associated with the ACK message, or a frequency diversity attribute associated with the ACK message, or a peak to average power ratio (PAPR) attribute associated with the ACK message, or a combination thereof. The method may include determining that the transmission received in the TTI is associated with a high priority communication.

In a second illustrative set of examples, an apparatus for wireless communication is described. The apparatus may include: a processor; memory in electronic communication with the processor; and instructions stored in the memory. The instructions being executable by the processor to: receive a transmission in a TTI; identify an UL ACK channel configuration based at least in part on a format of the TTI; and send an ACK message via an UL ACK channel according to the identified UL ACK channel configuration.

In some examples, the format of the TTI may include a plurality of symbols for the transmission. The apparatus may include instructions executable by the processor to: decode a first symbol of the plurality of symbols in the transmission in the TTI; and schedule at least a portion of a resource associated with conveying the ACK message prior to decoding a second symbol of the plurality of symbols in the transmission in the TTI. The apparatus may include instructions executable by the processor to utilize the resource to send at least a portion of the ACK message prior to receiving each of the symbols of the plurality of symbols in the transmission. At least a portion of the ACK message may include at least pilot information, or channel space feedback information, or ACK/NACK information, or a combination thereof.

In some examples, the apparatus may include instructions executable by the processor to send the ACK message in more than one symbol in a subsequent TTI. The apparatus may include instructions executable by the processor to select an iFDMA waveform for the UL ACK channel configuration. The apparatus may include instructions executable by the processor to determine that the transmission in the TTI is associated with a high priority communication.

In some examples, the format of the TTI may include one symbol for the transmission. The apparatus may include instructions executable by the processor to: select an iFDMA waveform for the UL ACK channel configuration; and send the ACK message via the UL ACK channel using the iFDMA waveform. The apparatus may include instructions executable by the processor to: identify a communication metric associated with the ACK message; and select a non-zero tone value for the iFDMA waveform based at least in part on the communication metric, the non-zero tone value corresponding to a number of non-zero tones within a predetermined number of tones of the iFDMA waveform.

In some examples, the iFDMA waveform may be multiplexed with one or more other iFDMA waveforms to capture orthogonality and spectrum efficiency. The communication metric may include at least a latency attribute associated with the ACK message, or a frequency diversity attribute associated with the ACK message, or a PAPR attribute associated with the ACK message, or a combination thereof. The apparatus may include instructions executable by the processor to determine that the transmission received in the TTI is associated with a high priority communication.

In a third illustrative set of examples, an apparatus for wireless communication is described. The apparatus may include: means for receiving a transmission in a TTI; means for identifying an UL ACK channel configuration based at least in part on a format of the TTI; and means for sending an ACK message via an UL ACK channel according to the identified UL ACK channel configuration.

In some examples, the format of the TTI may include a plurality of symbols for the transmission. The apparatus may include: means for decoding a first symbol of the plurality of symbols in the transmission in the TTI; and means for scheduling at least a portion of a resource associated with conveying the ACK message prior to decoding a second symbol of the plurality of symbols in the transmission in the TTI.

In a fourth illustrative set of examples, a non-transitory computer-readable medium storing computer-executable code for wireless communication is described. The code executable by a processor to: receive a transmission in a transmission time interval (TTI); identify an uplink (UL) acknowledgement (ACK) channel configuration based at least in part on a format of the TTI; and send an ACK message via an UL ACK channel according to the identified UL ACK channel configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
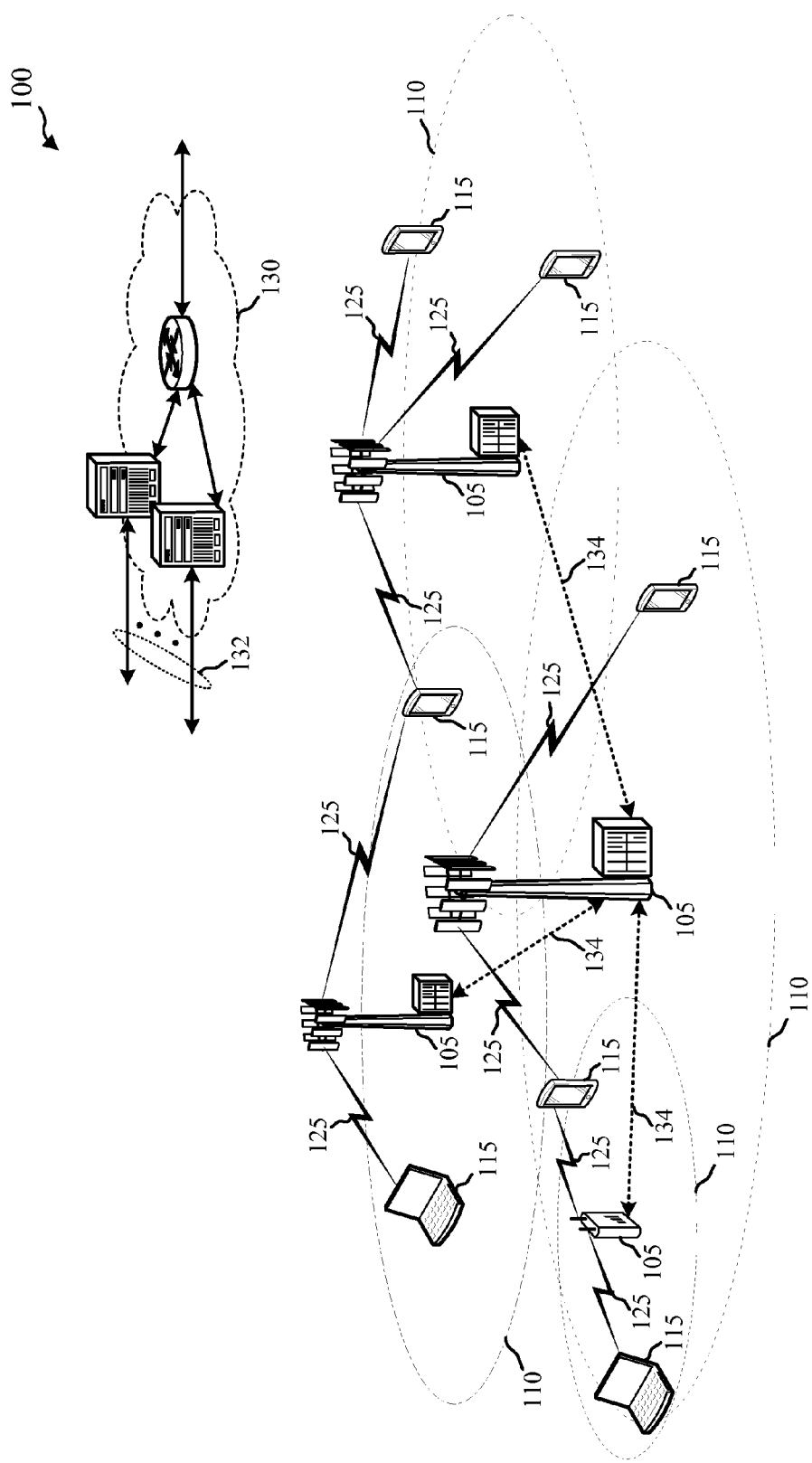
FIG. 1 shows a block diagram of a wireless communication system, in accordance with various aspects of the present disclosure.

Conventional acknowledgement and retransmission procedures may include a receiving device receiving a transmission during a first transmission time interval (TTI), processing the transmission to identify errors, and responding with an acknowledgement (ACK) or negative-acknowledgement (NACK) a predetermined number n of TTIs after receipt of the transmission, where n is a positive integer. In some examples, a user equipment (UE) may send an ACK/NACK message to the transmitting device 4 TTIs, 6 TTIs, or some other number depending on the configuration, after the receipt of the information being acknowledged. An ACK message may, in some examples, consist of one or two ACK/NACK bits transmitted on an ACK channel (e.g., physical hybrid automatic repeat request (HARQ) indicator channel (PHICH), physical uplink control channel (PUCCH), etc.).

Transmission of the ACK/NACK message a predetermined number of n TTIs after receipt of the transmission may, however, result in delays in certain types of transmissions that may benefit from low latency, e.g., mission critical or high priority transmissions. Generally, such transmissions may benefit a lower latency to reduce the round trip time (RTT) for the transmission, determined as the time between the transmission occurs until an ACK message is received. Additionally, such transmission types may also benefit from improved robustness over conventional ACK/NACK procedures. For example, conventional techniques including one or two bits for the ACK/NACK message may not be successful in certain environments where the ACK/NACK message itself is corrupted. In that scenario, the transmitting device may be forced to retransmit the information, which further increases the RTT.

According to aspects of the present description, a receiving device may utilize various techniques to lower latency and/or to improve robustness for ACK/NACK transmissions. Generally, the receiving device may employ various aspects of a waveform design and/or multi-symbol TTI designs to lower latency, improve robustness, lower peak-to-average power ratio (PAPR), and the like, for the ACK transmission. For example, a receiving device may receive a transmission from a transmitting device in a TTI. The TTI may identify the duration of a transmission on a radio link. The receiving device may identify an uplink (UL) ACK channel configuration based on the format of the TTI. In some examples, the UL ACK channel configuration may include using an interleaved frequency division multiple access (iFDMA) waveform design on the UL ACK channel and/or employing multiple symbols per TTI on the UL ACK channel. The receiving device may send an acknowledgement message (e.g., ACK message or NACK message) on the UL ACK channel according to the UL ACK channel configuration.

For convenience, the present description generally describes the receiving device identifying or otherwise determining an UL ACK channel configuration based on the format of the TTI. For example, a UE may employ the described techniques to determine an UL ACK channel (e.g., PUCCH) configuration for sending ACK/NACK messages. However, it is to be understood that the described techniques are equally applicable to a downlink (DL) ACK channel. For example, a base station may employ the described techniques to determine a DL ACK channel (e.g., PHICH) configuration for sending ACK/NACK messages. Therefore, references to a receiving device may refer to a UE (for base station-to-UE or UE-to-UE communications) and/or to a base station (for UE-to-base station or base station-to-base station communications).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up only a portion of the coverage area (not shown). The wireless communications system 100 may include base stations 105 of different types (e.g., macro and/or small cell base stations). There may be overlapping geographic coverage areas 110 for different technologies.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARM) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include UL transmissions from a UE 115 to a base station 105, and/or DL transmissions, from a base station 105 to a UE 115. The DL transmissions may also be called forward link transmissions while the UL transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using frequency division duplexing (FDD) (e.g., using paired spectrum resources) or time division duplexing (TDD) operation (e.g., using unpaired spectrum resources). Frame structures for FDD (e.g., frame structure type 1) and TDD (e.g., frame structure type 2) may be defined.

In some embodiments of the system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple DL CCs and one or more UL CCs for carrier aggregation. Carrier aggregation may be used with both FDD and TDD component carriers.

Wireless communications system 100 may support ACK channel configurations to reduce latency, lower PAPR, and improve robustness for acknowledgement reporting messages. For example, a receiving device (e.g., UE 115 or base station 105) may receive a transmission in a TTI from a sending or transmitting device. The format of the TTI may include one symbol in the TTI or multiple symbols in the TTI. The receiving device may identify an UL (or DL) ACK channel configuration based on the format of the TTI. The ACK channel configuration may include utilizing a wideband waveform design (e.g., an iFDMA waveform) and/or scheduling acknowledgement resources prior to decoding all the symbols in the TTI (for a multi-symbol TTI design). Accordingly, the receiving device may send an ACK message on the UL (or DL) ACK channel according to the identified UL (or DL) ACK channel configuration.

In some aspects, the wideband waveform design may include an iFDMA waveform that captures frequency diversity over a wide bandwidth to achieve high reliability or robustness for the acknowledgement reporting as well as to lower latency. Generally, the iFDMA waveform may use one non-zero tone every k tones (e.g., 16 tones) to repeat the acknowledgement information over a time period. Spreading the acknowledgement information over a wider bandwidth may lower the PAPR for acknowledgement reporting. Moreover, the UL control channel may incorporate pilot signal and control information (e.g., channel space feedback (CSF) information) into the acknowledgement reporting. The CSF information may provide modulation and coding scheme (MCS) adaptation in the retransmission of transmissions including errors. Other examples of a wideband waveform design may include a localized FDMA (LFDMA) waveform design with frequency hopping, a wideband code-division multiple access (CDMA) waveform design, or some other wideband waveform design that captures frequency diversity while avoiding or limiting interference to other UEs 115, base stations 105, etc.

Figure 2:
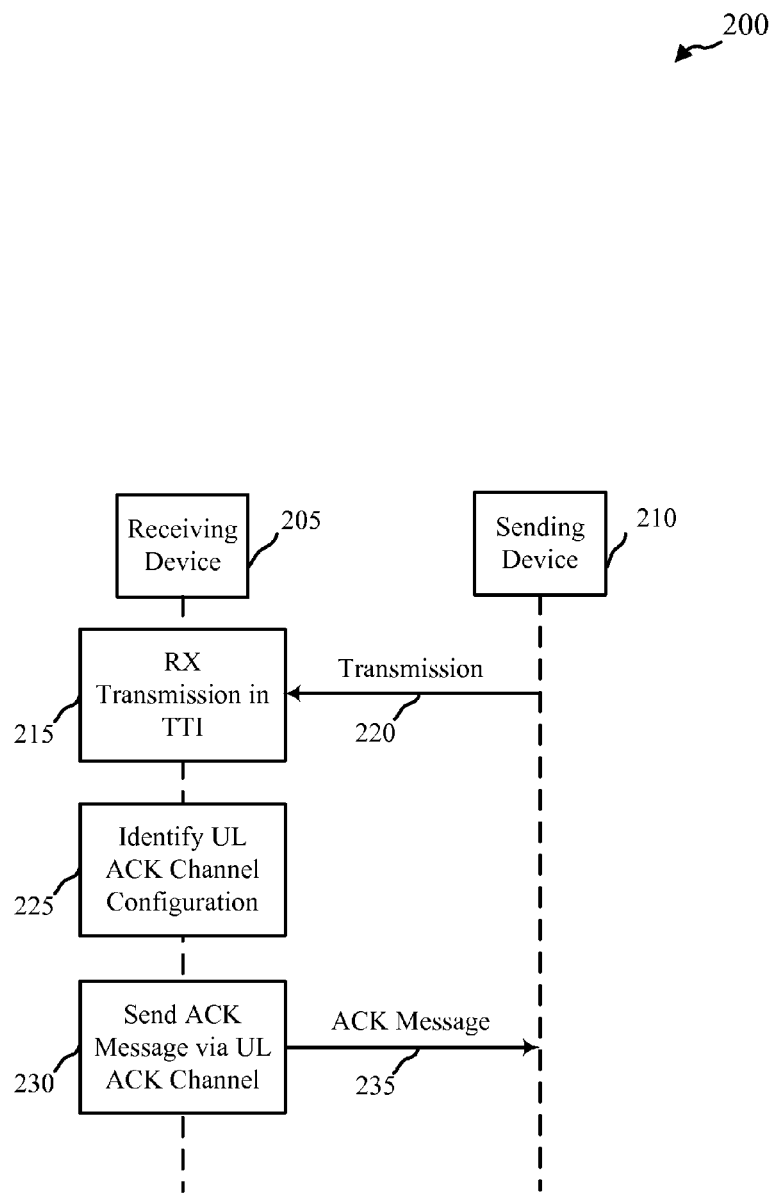
FIG. 2 shows a swim diagram illustrating aspects of acknowledgement procedures in wireless communication, in accordance with various aspects of the present disclosure.

FIG. 2 is a swim diagram 200 illustrating aspects of acknowledgment operations, in accordance with various aspects of the present disclosure. The diagram 200 may illustrate aspects of the system 100 described with reference to FIG. 1. The diagram 200 includes a receiving device 205 and a sending device 210. The receiving device 205 and/or the sending devices 210 may be examples of one or more of the base stations 105 and/or the UEs 115 described above with respect to FIG. 1. Generally, the diagram 200 illustrates aspects of implementing robust, low latency acknowledgement procedures in wireless communication systems. In some examples, a system device, such as one of the base stations 105 and/or one of the UEs 115 may execute one or more sets of codes to control the functional elements of the device to perform some or all of the functions described below.

At block 215, the receiving device 205 may receive a transmission 220 from the sending device 210. The transmission may be in a TTI, e.g., a time interval associated with transmitting a wireless signal. The TTI may have a format that includes one or more symbols in the transmission.

At block 225, the receiving device 205 may identify an UL ACK channel configuration based on the format of the TTI. For example, the receiving device 205 may select an UL ACK channel configuration that addresses low latency issues, reduces PAPR for ACK reporting, and addresses link budget constraints for the acknowledgement reporting. Aspects of the UL ACK channel configuration may also provide for transmission of pilot information and/or control information (e.g., CSF) associated with acknowledgement reporting. In some examples, the UL ACK channel configuration may include utilizing a wideband waveform, implement an acknowledgement reporting scheme optimizing multiple symbols within a TTI, or combinations thereof.

At block 230, the receiving device 205 may send an ACK message 235 to the sending device 210 on the UL ACK channel and according to the identified UL ACK channel configuration. For example, the receiving device 205 may send the ACK message using a wideband waveform pattern to achieve frequency diversity, using a multi-symbol per TTI design, and the like.

Figure 3:
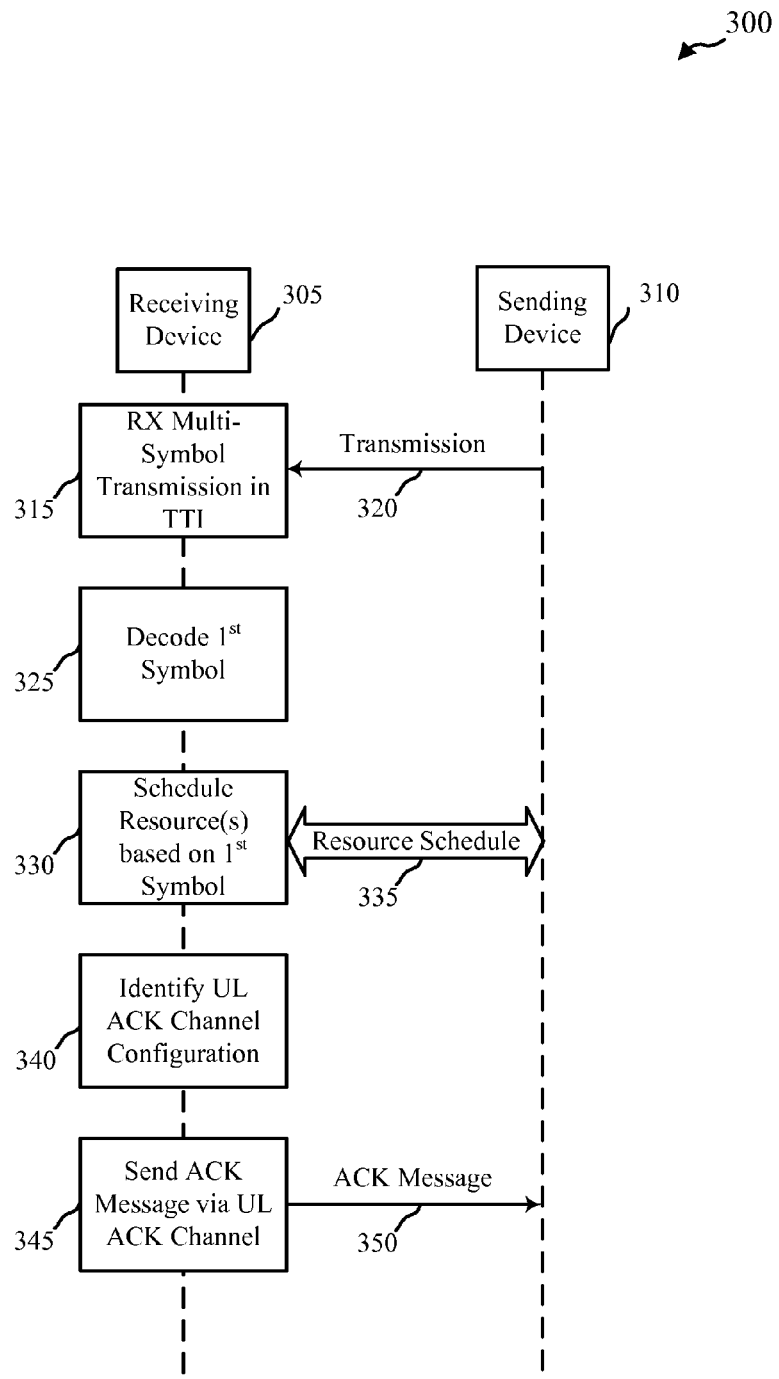
FIG. 3 shows a swim diagram illustrating aspects of acknowledgement procedures in wireless communication, in accordance with various aspects of the present disclosure.

FIG. 3 is a swim diagram 300 illustrating aspects of acknowledgment operations, in accordance with various aspects of the present disclosure. The diagram 300 may illustrate aspects of the system 100 described with reference to FIG. 1. The diagram 300 includes a receiving device 305 and a sending device 310. The receiving device 305 and/or the sending devices 310 may be examples of one or more of the base stations 105 and/or the UEs 115 described above with respect to FIG. 1. Generally, the diagram 300 illustrates aspects of implementing robust, low latency acknowledgement procedures in wireless communication systems. In some examples, a system device, such as one of the base stations 105 and/or one of the UEs 115 may execute one or more sets of codes to control the functional elements of the device to perform some or all of the functions described below.

At block 315, the receiving device 305 may receive a transmission 320 from the sending device 310. The transmission may be in a TTI, e.g., a time interval associated with transmitting a wireless signal. The TTI may have a format that includes more than one symbols in the transmission. For example, the TTI may include two, three, four, or some other number of symbols.

At block 325, the receiving device 305 may decode a first symbol of the plurality of symbols in the transmission in the TTI. For example, the receiving device 305 may decode the first symbol while still receiving the second, third, etc., symbols in the transmission. Accordingly, the receiving device 305 may determine, based on decoding the first symbol, that the transmission is intended for the receiving device 305 and that acknowledgment reporting is expected for the transmission. Accordingly and at block 330, the receiving device may schedule one or more resources associated with sending the acknowledgement reporting information. The receiving device 305 may schedule the resources, e.g., UL ACK channel resources, with the sending device 310 at 335. The receiving device 305 may schedule the resources based on the decoding the first symbol and, in some examples, prior to decoding the remaining symbols in the transmission. As will be discussed in greater detail with reference to FIG. 4, this feature may improve latency and RTT attributes associated with the transmission and may, in some aspects, provide for robustness in the acknowledgement reporting.

At block 340, the receiving device 305 may identify an UL ACK channel configuration based on the format of the TTI. For example, the receiving device 305 may select an UL ACK channel configuration based on the number of symbols included in the transmission in the TTI. Aspects of the UL ACK channel configuration may also provide for transmission of pilot information and/or control information (e.g., CSF) associated with acknowledgement reporting. In some examples, the UL ACK channel configuration may leverage the plurality of symbols in the transmission in the TTI to provide for more robust acknowledgement reporting.

At block 345, the receiving device 305 may send an ACK message 350 to the sending device 310 on the UL ACK channel and according to the identified UL ACK channel configuration. For example, the receiving device 305 may send the ACK message using a plurality of symbols in one or more subsequent TTIs to convey the acknowledgement reporting.

Figure 4:
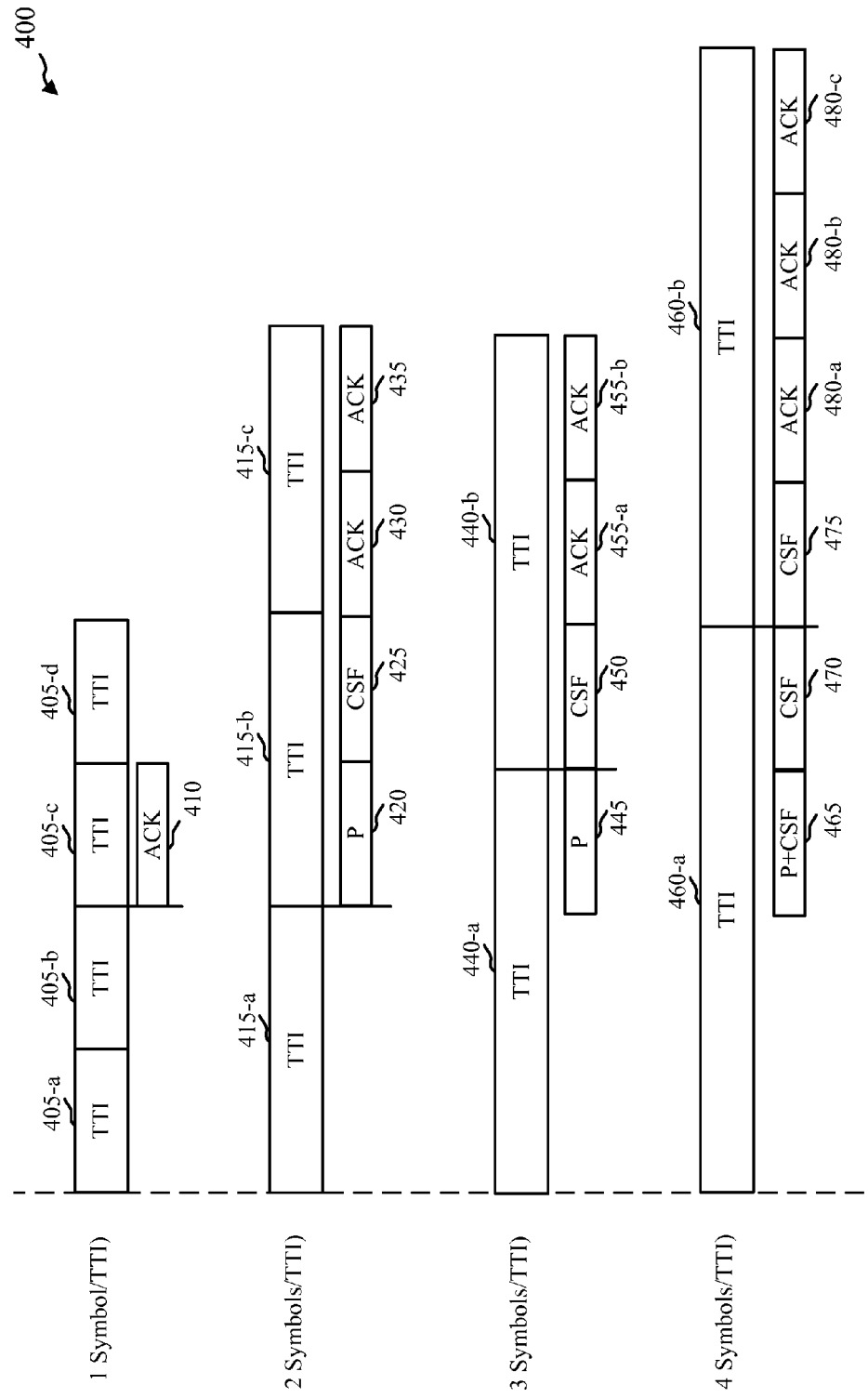
FIG. 4 shows a diagram of aspects of examples of acknowledgement schemes for use in wireless communication, in accordance with various aspects of the present disclosure.

FIG. 4 shows a diagram 400 of aspects of an example acknowledgement scheme for use in wireless communication, in accordance with various aspects of the present disclosure. The diagram 400 may illustrate aspects of the system 100 described with reference to FIG. 1. Generally, diagram 400 illustrates an example of one or more aspects of acknowledgement reporting between a receiving device and a sending device. In some examples, a system device, such as one or more base stations, such as base stations 105, UEs 115, receiving device 205 and/or 305, described with reference to FIGS. 1, 2, and/or 3, may execute one or more sets of codes to control the functional elements of the device to perform some or all of the functions illustrated with respect to diagram 400.

Generally, diagram 400 illustrates aspects of acknowledgement reporting using 1, 2, 3, or 4 symbols in a transmission in a TTI. That is, the TTI may have a format including the 1, 2, 3, or 4 symbols. A TTI is generally referred to as the duration of a transmission on the radio link layer. In certain aspects, the TTI may be associated with the size of the data blocks received at the radio link layer from higher layers, e.g., MAC layer. A symbol may generally refer to a block of information within a time frame on a given subcarrier or tone. Aspects of the present description may leverage the format of the TTI transmission to improve acknowledgement reporting.

Generally, acknowledgement reporting may be associated with an ARQ or HARQ process. As one example and with reference to the one symbol per TTI example of diagram 400, a sending device may send a transmission during TTI 405-a, the receiving device may process the received transmission during TTI 405-b, send acknowledgement information (ACK/NACK) during TTI 405-c, where the sending device processes the acknowledgement information during TTI 405-d. This HARQ process may allow for retransmission of information lost due to errors, corruption, etc.

In certain aspects of the present disclosure, the receiving device may utilize a wideband waveform design as at least one component of the UL ACK channel configuration to send the ACK message. For example, the wideband waveform may include an iFDMA waveform, a frequency-hopped LFDMA waveform, a CDMA waveform, or some other waveform design that achieves frequency diversity. Generally, the wideband waveform design will achieve frequency diversity, but without causing interference to other devices. The wideband waveform design may also provide improved reliability in that the ACK message, pilot information, CSF information, and the like, can be spread across multiple tones of the wideband signal. In some examples, the wideband tone may use a Zardoff-Chu sequence to reduce the PAPR for the acknowledgement reporting. For example, a single symbol sequence may be encoded with a few bits of payload data, e.g., ACK/NACK information, CSF, etc.

In one example, there is one symbol in each TTI 405, e.g., a 1 symbol/TTI design. For example, the receiving device may receive a transmission in a first TTI 405-a, may process the transmission in a second TTI 405 (e.g., decode the symbol in the first TTI 405-a), and may send an ACK message 410 during a third TTI 405-c, where the sending device processes the ACK message during a fourth TTI 405-d. The receiving device may utilize the wideband signal design aspects discussed above to send the ACK message, e.g., spread the ACK message across multiple tones of the wideband signal in the TTI 405-c to lower PAPR, lower pilot overhead while achieving frequency diversity. In some aspects, the ACK message 410 included in one symbol of the third TTI 405-c may include pilot information, CSF information, and ACK information.

In another example, there may be two symbols in each TTI 415. For example, the receiving device may receive a transmission in a first TTI 415-a that includes two symbols. The receiving device may begin to decode the transmission during the first TTI 415-a, i.e., before receiving the second symbol of the TTI 415-a. Based on decoding the first symbol, the receiving device may determine that the transmission is intended for it and that acknowledgement reporting is expected. Accordingly, the receiving device may begin to schedule resources for acknowledgement reporting even before the second symbol of the first TTI 415-a is decoded. In some aspects, the receiving device may schedule separate symbols for the pilot information, CSF information, and ACK information. Accordingly, the receiving device may continue to process the second symbol during a second TTI 415-b while transmitting pilot information 420 and CSF information 425. The CSF information 425 may provide link adaptation information for potential retransmission. By the end of the second TTI 415-b, the receiving device will have completed decoding the second symbol of the transmission in the first TTI 415-a and may send acknowledgement information 430 and 435 during the third TTI 415-c. The acknowledgement information 430 and 435 may be the same acknowledgement information, in some examples, and therefore provide for redundancy in the acknowledgement reporting. The receiving device may optionally utilize the wideband waveform design discussed in the acknowledgement reporting schemes including two symbols per TTI 415.

In another example, there may be three symbols in each TTI 440. For example, the receiving device may receive a transmission in a first TTI 440-a that includes three symbols. The receiving device may begin to decode the transmission during the first TTI 440-a, i.e., before receiving and/or decoding the second and/or third symbols of the TTI 440-a. Based on decoding the first symbol, the receiving device may determine that the transmission is intended for it and that acknowledgement reporting is expected. Accordingly, the receiving device may begin to schedule resources for acknowledgement reporting even before the second or third symbols of the first TTI 440-a are decoded. In some aspects, the receiving device may schedule separate symbols for the pilot information, CSF information, and ACK information. Accordingly, the receiving device may begin portions of the acknowledgement reporting during the first TTI 440-a by sending a pilot information 445. The receiving device may continue to process the second and third symbols and transmit CSF information 450 and ACK information 455 during the second TTI 440-b. By the end of the second TTI 440-b, the receiving device will have completed sending ACK information 455-a and 455-b. The ACK information 455-a and 455-b may be the same acknowledgement information, in some examples, and therefore provide for redundancy in the acknowledgement reporting. The receiving device may optionally utilize the wideband waveform design discussed in the acknowledgement reporting schemes including three symbols per TTI 440.

In another example, there may be four symbols in each TTI 460. For example, the receiving device may receive a transmission in a first TTI 460-a that includes four symbols. The receiving device may begin to decode the transmission during the first TTI 460-a, i.e., before receiving and/or decoding the second-fourth symbols of the TTI 460-a. Based on decoding the first symbol, the receiving device may determine that the transmission is intended for it and that acknowledgement reporting is expected. Accordingly, the receiving device may begin to schedule resources for acknowledgement reporting even before the second-fourth symbols of the first TTI 460-a are decoded. In some aspects, the receiving device may schedule separate symbols for the pilot information, CSF information, and ACK information. Accordingly, the receiving device may begin portions of the acknowledgement reporting during the first TTI 460-a by sending a combined pilot and CSF information 465 and a second CSF information 470 during the first TTI 460-a. In some aspects, the sending device may decode the early combined pilot and CSF information 465 and use this information to determine whether a second transmission needs to be scheduled. The receiving device may continue to process the second-fourth symbols and transmit a third CSF information 475 and ACK information 480 during the second TTI 460-*b*. By the end of the second TTI 460-*b*, the receiving device will have completed sending ACK information 480. The ACK information 480-*a*, 480-*b*, and/or 480-*c* may be the same acknowledgement information, in some examples, and therefore provide for redundancy in the acknowledgement reporting. The receiving device may optionally utilize the wideband waveform design discussed in the acknowledgement reporting schemes including four symbols per TTI 460.

Additional aspects of the multi-symbol per TTI design may provide for improved RTT time. For example, the receiving device decoding the first symbol and reserving acknowledgement reporting resources before decoding the remaining symbols in the transmission may reduce the overall RTT time for the transmissions. Additionally, the multi-symbol per TTI design also provides additional robustness functions due to repeated acknowledgement information reporting, as well as CSF information reporting to improve link adaptation for retransmissions.

Additional aspects of the present disclosure may provide for multiplexing iFDMA waveforms (e.g., ACK channel and/or control channel) signals from different receiving devices. The multiplexing may provide for orthogonality and frequency diversity between the iFDMA waveform signals. For example, different receiving devices may select different non-zero values for the tones in the iFDMA waveform design to achieve multiplexing.

Figure 5:
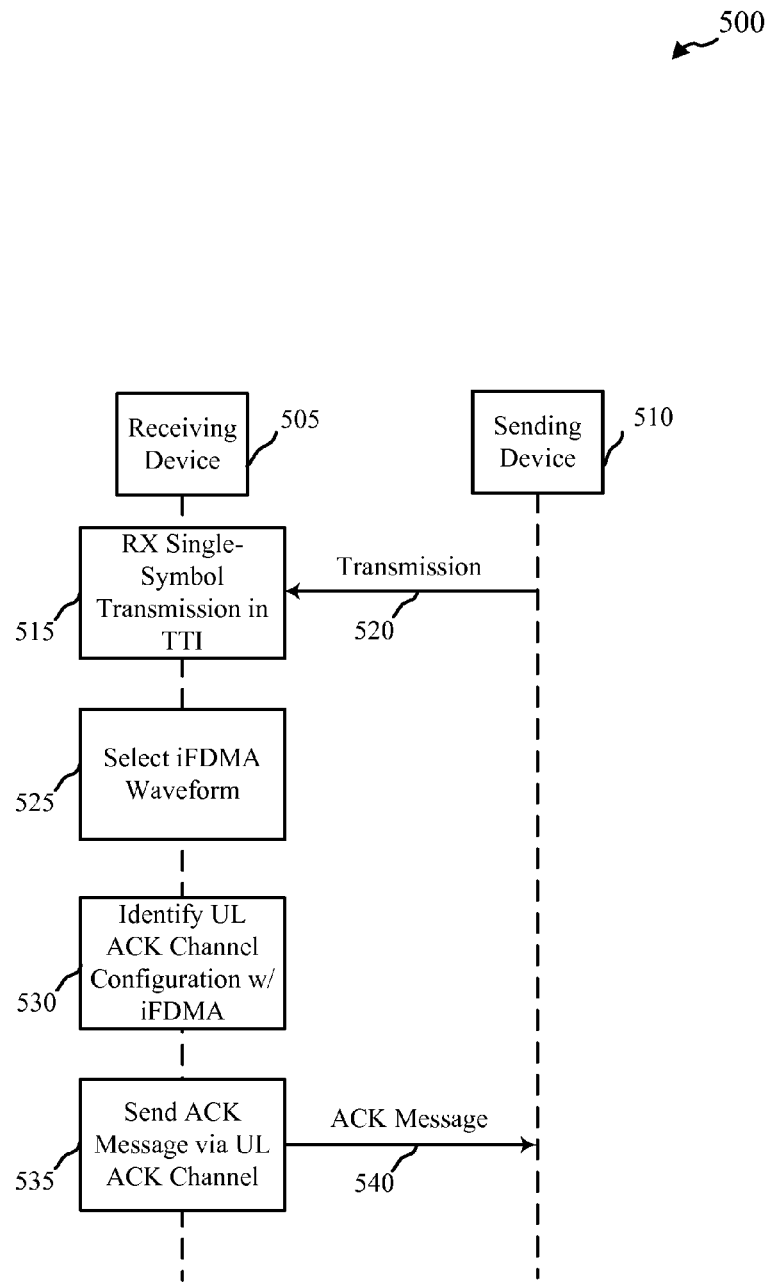
FIG. 5 shows a swim diagram illustrating aspects of acknowledgement procedures in wireless communication, in accordance with various aspects of the present disclosure.

FIG. 5 is a swim diagram 500 illustrating aspects of acknowledgment operations, in accordance with various aspects of the present disclosure. The diagram 500 may illustrate aspects of the system 100 described with reference to FIG. 1. The diagram 500 includes a receiving device 505 and a sending device 510. The receiving device 505 and/or the sending devices 510 may be examples of one or more of the base stations 105 and/or the UEs 115 described above with respect to FIG. 1. Generally, the diagram 500 illustrates aspects of implementing robust, low latency acknowledgement procedures in wireless communication systems. In some examples, a system device, such as one of the base stations 105 and/or one of the UEs 115 may execute one or more sets of codes to control the functional elements of the device to perform some or all of the functions described below.

At block 515, the receiving device 505 may receive a transmission 520 from the sending device 510. The transmission may be in a TTI, e.g., a time interval associated with transmitting a wireless signal. The TTI may have a format that includes one symbol in the transmission.

At block 525, the receiving device 505 may select an iFDMA waveform design (or some other wideband waveform design) based on the format of the TTI. For example, the receiving device 505 may select a wideband waveform design (e.g., iFDMA waveform) that permits spreading a symbol across multiple sub-channels or tones of the wideband waveform. In some examples, the symbol used for acknowledgement reporting may also convey pilot information and/or CSF information.

At block 530, the receiving device 505 may identify an UL ACK channel configuration based on the format of the TTI. For example, the receiving device 505 may select an UL ACK channel configuration based on the one symbol in the transmission in the TTI. Aspects of the UL ACK channel configuration may also provide for transmission of pilot information and/or control information (e.g., CSF) associated with acknowledgement reporting. In some examples, the UL ACK channel configuration including a wideband waveform design may provide for more robust acknowledgement reporting.

At block 535, the receiving device 505 may send an ACK message 540 to the sending device 510 on the UL ACK channel and according to the identified UL ACK channel configuration. For example, the receiving device 505 may send the ACK message using one symbol in one or more subsequent TTIs to convey the acknowledgement reporting and, in some examples, convey pilot information, CSF information, or combinations thereof.

Figure 6:
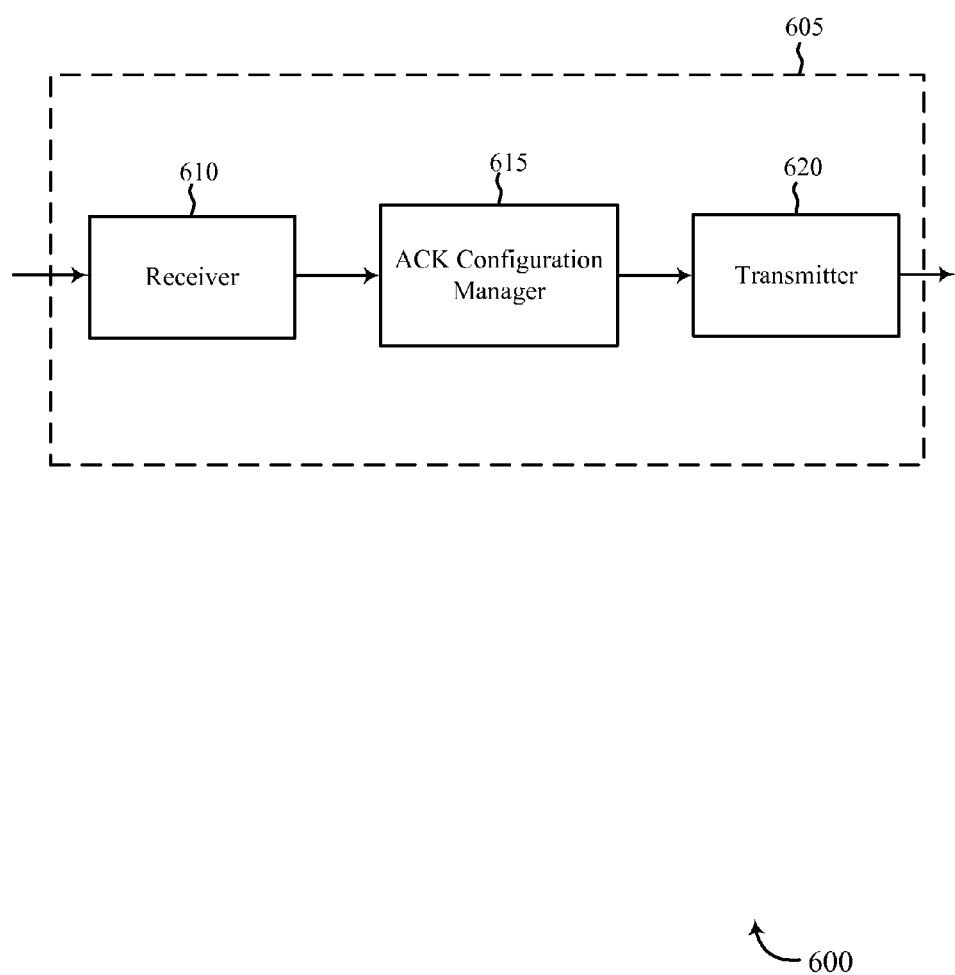
FIG. 6 shows a block diagram of a device configured for use in wireless communication, in accordance with various aspects of the present disclosure.

FIG. 6 shows a block diagram 600 of a device 605 for use in wireless communication, in accordance with various aspects of the present disclosure. The device 605 may be an example of one or more aspects of a UE 115 and/or base station 105 described with reference to FIG. 1. The device 605 may also be an example of a receiving device 205, 305, or 505 described with reference to FIGS. 2, 3, and 5. In some examples, the device 605 may implement one or more aspects of the features described with reference to FIG. 4. The device 605 may include a receiver 610, an ACK configuration manager 615, and/or a transmitter 620. The device 605 may also be or include a processor (not shown). Each of these modules may be in communication with each other.

The components of the device 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits (ICs). In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver 610 may receive information such as packets, user data, and/or control information associated with various information channels (e.g., control channels, data channels, etc.). The receiver 610 may be configured to receive transmissions in a TTI, wherein the TTI may include one symbol, or a plurality of symbols. Information may be passed on to the ACK configuration manager 615, and to other components of the device 605.

The ACK configuration manager 615 may monitor, control, or otherwise manage one or more aspects of ACK channel configurations for acknowledgement reporting for the device 605. In some examples, the ACK configuration manager 615 may, alone or in cooperation with the receiver 610, receive a transmission in a TTI from a sending device. The TTI may have a format that includes one symbol per TTI or a plurality of symbols per TTI. The ACK configuration manager 615 may determine, select, or otherwise identify an UL ACK channel configuration based, at least in some aspects, on the format of the TTI. The UL ACK channel configuration may include a wideband waveform design, a multi-symbol per TTI design scheme, and other features that lower latency, reduce PAPR, and improve robustness of the acknowledgement reporting. The ACK configuration manager 615 may, alone or in cooperation with the transmitter 720, send an ACK message on the UL ACK channel according to the identified UL ACK channel configuration. For example, the ACK message may include pilot information, CSF information, ACK information, etc.

The transmitter 620 may transmit the one or more signals received from other components of the device 605. The transmitter 620 may transmit one or more messages, waveform designs, etc., associated with acknowledgement reporting. In some examples, the transmitter 620 may be collocated with the receiver 610 in a transceiver.

Figure 7:
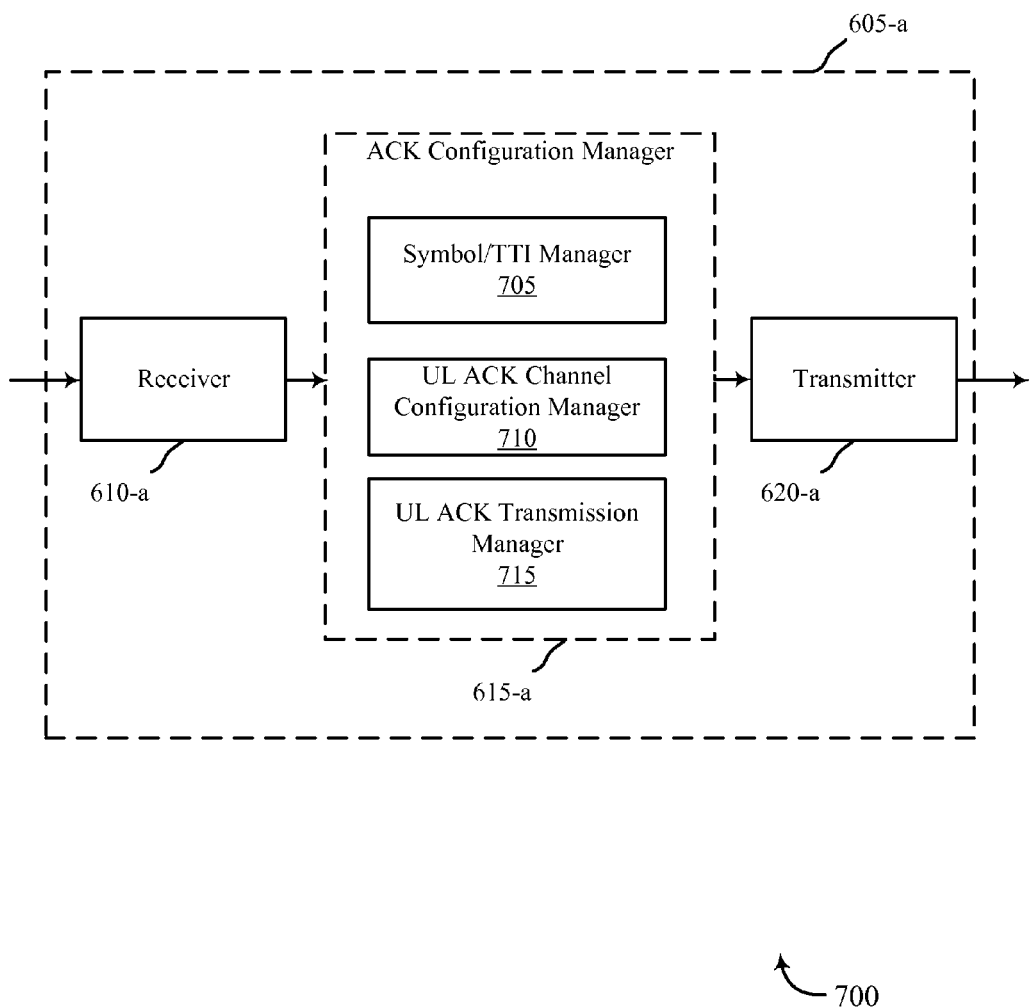
FIG. 7 shows a block diagram of a device configured for use in wireless communication, in accordance with various aspects of the present disclosure.

FIG. 7 shows a block diagram 700 of a device 605-*a* for use in wireless communication, in accordance with various examples. The device 605-*a* may be an example of one or more aspects of a UE 115 and/or a base station 105 described with reference to FIG. 1. It may also be an example of a device 605 described with reference to FIG. 6. The device 605-*a* may also be an example of a receiving device 205, 305, or 505 described with reference to FIGS. 2, 3, and 5. In some examples, the device 605-*a* may implement one or more aspects of the features described with reference to FIG. 4. The device 605-*a* may include a receiver 610-*a*, an ACK configuration manager 615-*a*, and/or a transmitter 620-*a*, which may be examples of the corresponding modules of device 605. The device 605-*a* may also include a processor (not shown). Each of these components may be in communication with each other. The ACK configuration manager 615-*a* may include a symbol per TTI manager 705, an UL ACK channel configuration manager 710, and/or an UL ACK transmission manager 715. The receiver 610-*a* and the transmitter 620-*a* may perform the functions of the receiver 610 and the transmitter 620, of FIG. 6, respectively.

The symbol per TTI manager 705 may monitor, control, or otherwise manage one or more aspects of TTI formats including one or a plurality of symbols for the device 605-*a*. For example, the symbol per TTI manager 705 may determine a format for a TTI based on a transmission received at the device 605-*a*. The TTI format may include one symbol per TTI or a plurality of symbols per TTI. The symbol per TTI manager 705 may output information to one or more modules of the device 605-*a* indicative of the format of the TTI. In some examples, the transmission may be associated with a high priority transmission, e.g., a mission critical transmission where receipt and acknowledgement reporting may, at least in certain aspects, be more important than other considerations, e.g., causing interference with other devices, and the like.

The UL ACK channel configuration manager 710 may monitor, control, or otherwise manage one or more aspects of determining an UL ACK channel configuration for the device 605-*a*. For example, the UL ACK channel configuration manager 710 may identify an UL ACK channel configuration based at least in part on a format of the TTI.

In some examples, the format of the TTI may include a plurality of symbols for the transmission. The UL ACK channel configuration manager 710 may decode a first symbol of the plurality of symbols in the transmission in the TTI and schedule at least a portion of a resources associated with conveying an ACK message prior to decoding a second (or other remaining) symbol(s) in the transmission. The device 605-*a* may use the resources to send at least a portion of the ACK message prior to receiving and/or decoding the remaining symbols in the transmission. The ACK message may include pilot information, CSF information, acknowledgement information (e.g., ACK/NACK), or a combination thereof.

In some examples, the UL ACK channel configuration manager 710 may identify a configuration that includes sending the ACK message in more than one symbols in a subsequent TTI, e.g., in a TTI after the TTI the transmission was received in. The ACK message, or at least a portion of the ACK message, may be sent over multiple symbols to reduce link-budget considerations and/or lower PAPR for the acknowledgement reporting.

In some examples, the UL ACK channel configuration manager 710 may identify a configuration that includes selecting a wideband waveform design, e.g., an iFDMA waveform design, for the acknowledgement reporting.

In some examples, the format of the TTI may include a single symbol for the transmission. In such examples, the UL ACK channel configuration manager 710 may also identify a configuration that includes a wideband waveform design, e.g., an iFDMA waveform design, a frequency-hopped LFDMA waveform design, and the like. Accordingly, the device 605-*a* may utilize the wideband waveform design to perform acknowledgement reporting.

In some examples, the UL ACK channel configuration manager 710 may identify a communication metric associated with the received transmission. Example communication metrics may include, but are not limited to, a latency attribute associated with the ACK message, or a frequency diversity attribute associated with the ACK message, or a PAPR attribute associated with the ACK message, or a combination thereof. The UL ACK channel configuration manager 710 may select a non-zero tone value for the iFDMA waveform based on the communication metric. The non-zero tone value may correspond to a number of non-zero tones within a predetermined number of tones in the iFDMA waveform. For example, the non-zero value may be 2, 4, 6, 8, 10, 12, 14, 16, etc., and may be based on the predetermined number of tones in the iFDMA waveform. In some examples, the iFDMA waveform may include 16 waveforms.

The UL ACK transmission manager 715 may monitor, control, or otherwise manage one or more aspects of transmitting messages or information for acknowledgement reporting for the device 605-*a*. For example, the UL ACK transmission manager 715 may manage one or more aspects of sending an ACK message via the UL ACK channel according to the identified UL ACK channel configuration. For example, the UL ACK transmission manager 715 may communicate with the symbol per TTI manager 705 and/or the UL ACK channel configuration manager 710 to determine various aspects for acknowledgement reporting.

In some examples, the UL ACK transmission manager 715 may send at least a portion of the ACK message prior to receiving and/or decoding all of the symbols in a transmission in a TTI having a format of a plurality of symbols. The UL ACK transmission manager 715 may, in cooperation with the transmitter 620-*a*, send the portions of the ACK message, e.g., pilot information, CSF information, etc., once a resource has been scheduled and allocated for acknowledgement reporting.

Figure 8:
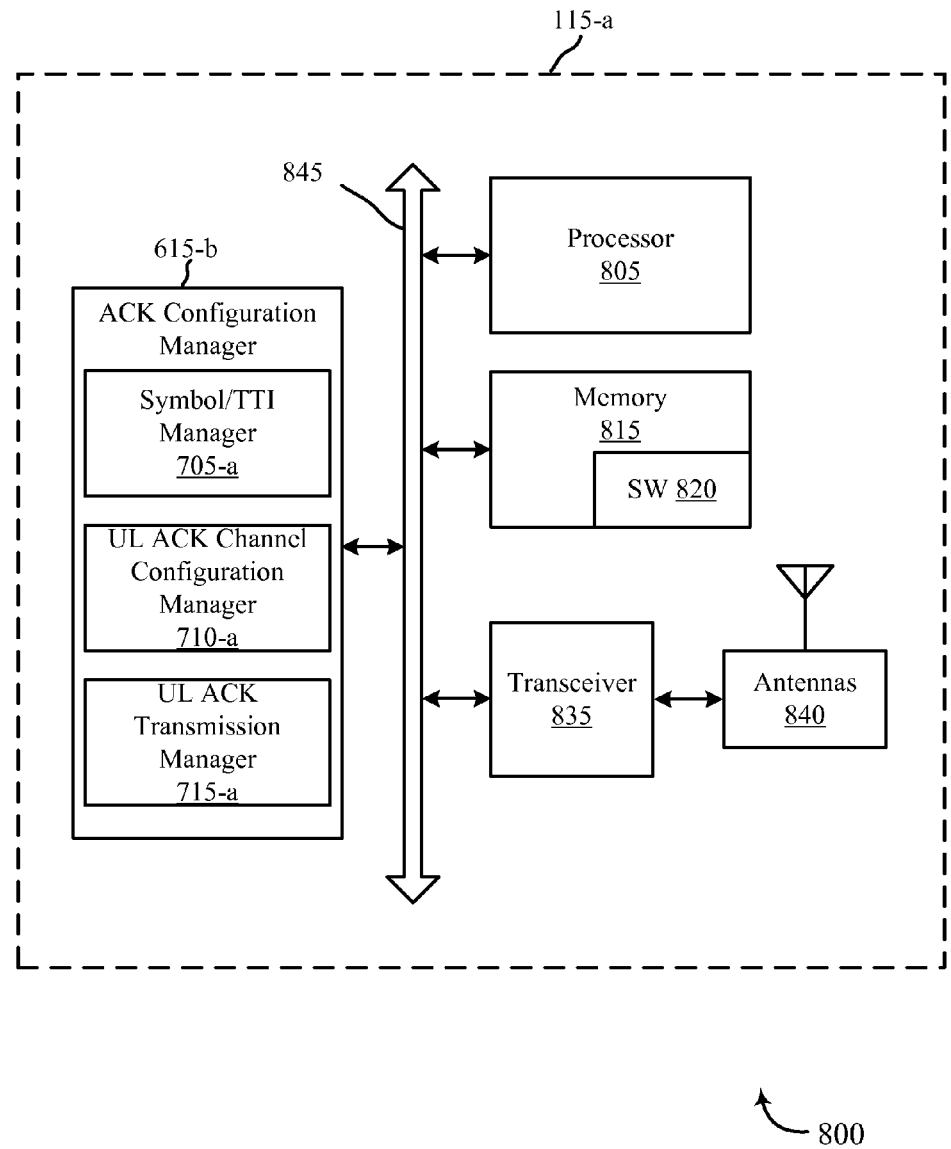
FIG. 8 shows a block diagram of a user equipment for use in wireless communications, in accordance with various aspects of the present disclosure.

FIG. 8 illustrates a block diagram of portions of a system 800 including a user equipment 115-*a* for use in wireless communication, in accordance with various aspects of the present disclosure. In some examples, the UE 115-*a* may be an example of the UEs 115 of FIG. 1, the receiving device 205, 305, and 505 of FIGS. 2, 3, and 5, respectively, and/or devices 605 of FIGS. 6 and 7. UE 115-*a* may include an ACK configuration manager 615-*b* which may be an example of and perform the functions of the ACK configuration manager 615 described with respect to FIGS. 6 and 7. UE 115-*a* may include components for bidirectional voice and data communications including components for transmitting communications and components for receiving communications. For example, UE 115-*a* may communicate bi-directionally with base stations and/or other UEs.

UE 115-*a* may include a processor 805, memory 815 (e.g., including software) 820, a transceiver 835, and one or more antenna(s) 840, each of which may communicate, directly or indirectly, with one another (e.g., via buses 845). The transceiver 835 may communicate bi-directionally, via the antenna(s) 840 or wired or wireless links, with one or more networks, as described above. For example, the transceiver 835 may communicate bi-directionally with a base station or another UE. The transceiver 835 may include a modem to modulate the packets and provide the modulated packets to the antenna(s) 840 for transmission, and to demodulate packets received from the antenna(s) 840. While UE 115-*a* may include a single antenna 840, UE 115-*a* may also have multiple antennas 840 capable of concurrently transmitting or receiving multiple wireless transmissions.

The memory 815 may include random access memory (RAM) and read only memory (ROM). The memory 815 may store computer-readable, computer-executable software/firmware code 820 including instructions that, when executed, cause the processor 805 to perform various functions described herein (e.g., acknowledgement reporting schemes, etc.). Alternatively, the software/firmware code 820 may not be directly executable by the processor 805 but cause a computer (e.g., when compiled and executed) to perform functions described herein. The processor 805 may include an intelligent hardware device, (e.g., a central processing unit (CPU), a microcontroller, an ASIC, etc.).

The ACK configuration manager 615-*b* may be configured to perform and/or control some or all of the features and/or functions described with reference to FIGS. 1-7 related to acknowledgement reporting operations for the UE 115-*a*. In some examples, the ACK configuration manager 615-*b* may receive a transmission in a TTI for the UE 115-*a*, identify an UL ACK channel configuration based on a format of the TTI, and send an ACK message via an UL ACK channel according to the identified UL ACK channel configuration. The ACK configuration manager 615-*b*, or portions thereof, may include a processor, and/or some or all of the functions of the ACK configuration manager 615-*b* may be performed by the processor 805 and/or in connection with the processor 805. In some examples, the ACK configuration manager 615-*b* may be an example of the ACK configuration manager 615 described with reference to FIGS. 6, and/or 7. For example, the ACK configuration manager 615-*b* may include a symbol per TTI manager 705-*a*, an UL ACK channel configuration manager 710-*a*, and/or an UL ACK transmission manager 715-*a*, which may be examples of and perform the functions of the symbol per TTI manager 705, the UL ACK channel configuration manager 710, and/or the UL ACK transmission manager 715, respectively, described with reference to FIG. 7.

Figure 9:
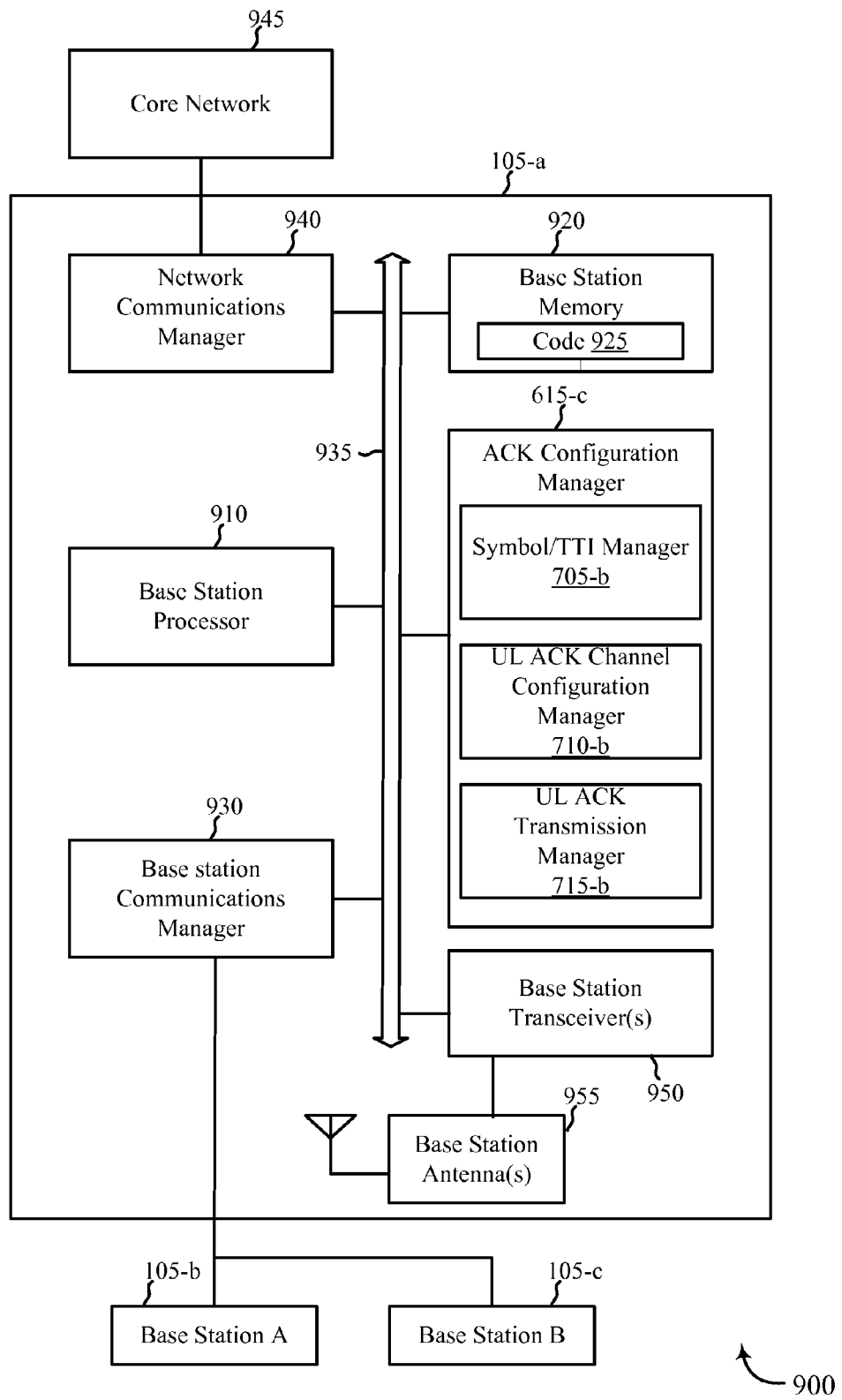
FIG. 9 shows a block diagram of a base station (e.g., a base station forming part or all of an eNB) for use in wireless communications, in accordance with various aspects of the present disclosure.

FIG. 9 shows a block diagram 900 of a base station 105-*a* (e.g., a base station forming part or all of an eNB) for use in wireless communication, in accordance with various aspects of the present disclosure. In some examples, the base station 105-*a* may be an example of aspects of one or more of the base stations 105 described with reference to FIG. 1, aspects of one or more of the receiving devices 205, 305, and 505, described with reference to FIGS. 2, 3, and 5, respectively, and/or aspects of one or more of the devices 605 when configured as a base station, as described with reference to FIGS. 6 and/or 7. The base station 105-*a* may be configured to implement or facilitate at least some of the base station and/or apparatus features and functions described with reference to FIGS. 1-8.

The base station 105-*a* may include a base station processor 910, a base station memory 920, at least one base station transceiver (represented by base station transceiver 950), at least one base station antenna (represented by base station antenna(s) 955), and/or an ACK configuration manager 615-*c*. The base station 105-*a* may also include one or more of a base station communications manager 930 and/or a network communications manager 940. Each of these modules may be in communication with each other, directly or indirectly, over one or more buses 935.

The base station memory 920 may include random access memory (RAM) and/or read-only memory (ROM). The base station memory 920 may store computer-readable, computer-executable software/firmware code 925 containing instructions that are configured to, when executed, cause the base station processor 910 to perform various functions described herein related to wireless communication (e.g., to perform acknowledgement reporting in a wireless communication system, etc.). Alternatively, the computer-readable, computer-executable software/firmware code 925 may not be directly executable by the base station processor 910 but be configured to cause the base station 105-*a* (e.g., when compiled and executed) to perform various of the functions described herein.

The base station processor 910 may include an intelligent hardware device, e.g., a central processing unit (CPU), a microcontroller, an ASIC, etc. The base station processor 910 may process information received through the base station transceiver 950, the base station communications manager 930, and/or the network communications manager 940. The base station processor 910 may also process information to be sent to the base station transceiver 950 for transmission through the antenna(s) 955, to the base station communications manager 930, for transmission to one or more other base stations 105-*b* and 105-*c*, and/or to the network communications manager 940 for transmission to a core network 945, which may be an example of one or more aspects of the core network 130 described with reference to FIG. 1. The base station processor 910 may handle, alone or in connection with the ACK configuration manager 615-*c*, various aspects of acknowledgement reporting procedures for the base station 105-*a*.

The base station transceiver 950 may include a modem configured to modulate packets and provide the modulated packets to the base station antenna(s) 955 for transmission, and to demodulate packets received from the base station antenna(s) 955. The base station transceiver 950 may, in some examples, be implemented as one or more base station transmitter modules and one or more separate base station receiver modules. The base station transceiver 950 may support communications in a first radio frequency spectrum band and/or a second radio frequency spectrum band. The base station transceiver 950 may be configured to communicate bi-directionally, via the antenna(s) 955, with one or more UEs or apparatuses, such as one or more of the UEs 115 described with reference to FIG. 1. The base station 105-*a* may, for example, include multiple base station antennas 955 (e.g., an antenna array). The base station 105-*a* may communicate with the core network 945 through the network communications manager 940. The base station 105-*a* may also communicate with other base stations, such as the base stations 105-*b* and 105-*c*, using the base station communications manager 930.

The ACK configuration manager 615-*c* may be configured to perform and/or control some or all of the features and/or functions described with reference to FIGS. 1-8 related to acknowledgement reporting operations for the base station 105-*a*. In some examples, the ACK configuration manager 615-*c* may receive a transmission in a TTI for the base station 105-*a*, identify an UL ACK channel configuration based on a format of the TTI, and send an ACK message via an UL ACK channel according to the identified UL ACK channel configuration. The ACK configuration manager 615-*c*, or portions thereof, may include a processor, and/or some or all of the functions of the ACK configuration manager 615-*c* may be performed by the base station processor 910 and/or in connection with the base station processor 910. In some examples, the ACK configuration manager 615-*c* may be an example of the ACK configuration manager 615 described with reference to FIGS. 6, 7, and/or 8. For example, the ACK configuration manager 615-*c* may include a symbol per TTI manager 705-*b*, an UL ACK channel configuration manager 710-*b*, and/or an UL ACK transmission manager 715-*b*, which may be examples of and perform the functions of the symbol per TTI manager 705, the UL ACK channel configuration manager 710, and/or the UL ACK transmission manager 715, respectively, described with reference to FIG. 7.

Figure 10:
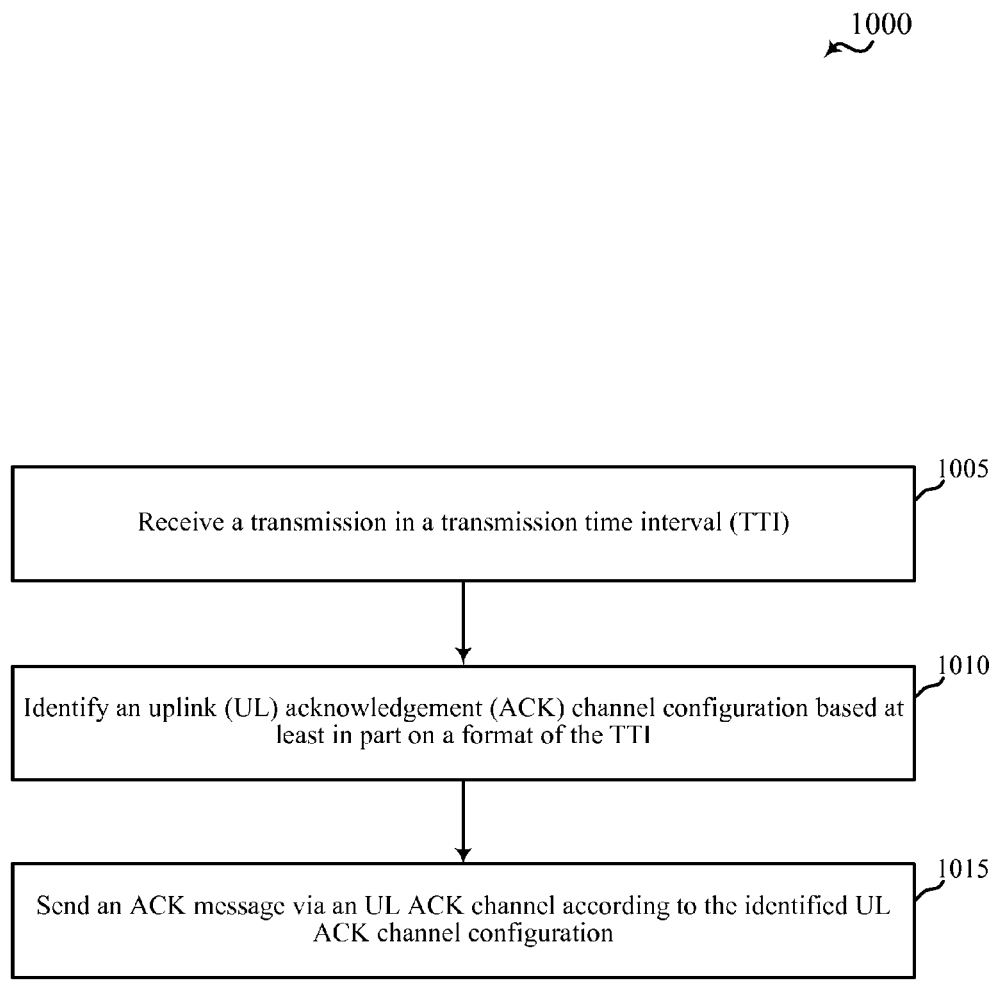
FIG. 10 is a flow chart illustrating an example of a method for wireless communication, in accordance with various aspects of the present disclosure.

FIG. 10 shows a flowchart illustrating a method 1000 for wireless communications, in accordance with various aspects of the present disclosure. The operations of method 1000 may be implemented by a UE 115 or its components, by a base station 105 or its components, and/or by a receiving device or its components, as described with reference to FIGS. 1-9. For example, the operations of method 1000 may be performed by the ACK configuration manager 615 as described with reference to FIGS. 6-9. In some examples, a UE 115 or a base station 105 may execute a set of codes to control the functional elements of the UE 115 or base station 105 to perform the functions described below. Additionally or alternatively, the UE 115 or base station 105 may perform aspects of the functions described below using special-purpose hardware. For convenience, the functions of the method 1000 will be described with reference to a receiving device, such as a UE 115 or a base station 105.

At block 1005, the method 1000 may include a receiving device receiving a transmission in a TTI. The transmission may be received from a sending device. The TTI may have a format based at least in part on the number of symbols in the transmission.

At block 1010, the method 1000 may include the receiving device identifying an UL ACK channel configuration based at least in part on the format of the TTI. For example, the UL ACK channel configuration may include selecting a wideband waveform signal for acknowledgement reporting. Other examples may additionally or alternatively include a multi-symbol per TTI design.

At block 1015, the method 1000 may include the receiving device sending an ACK message via the UL ACK channel according to the UL ACK channel configuration. For example, the ACK message may be sent in a wideband waveform signal that may include one or more symbols conveying ACK information, pilot information, CSF information, and the like.

The operation(s) at block 1005, 1010, and/or 1015 may be performed using the ACK configuration manager 615 described with reference to FIGS. 6-9.

Thus, the method 1000 may provide for wireless communication. It should be noted that the method 1000 is just one implementation and that the operations of the method 1000 may be rearranged or otherwise modified such that other implementations are possible.

Figure 11:
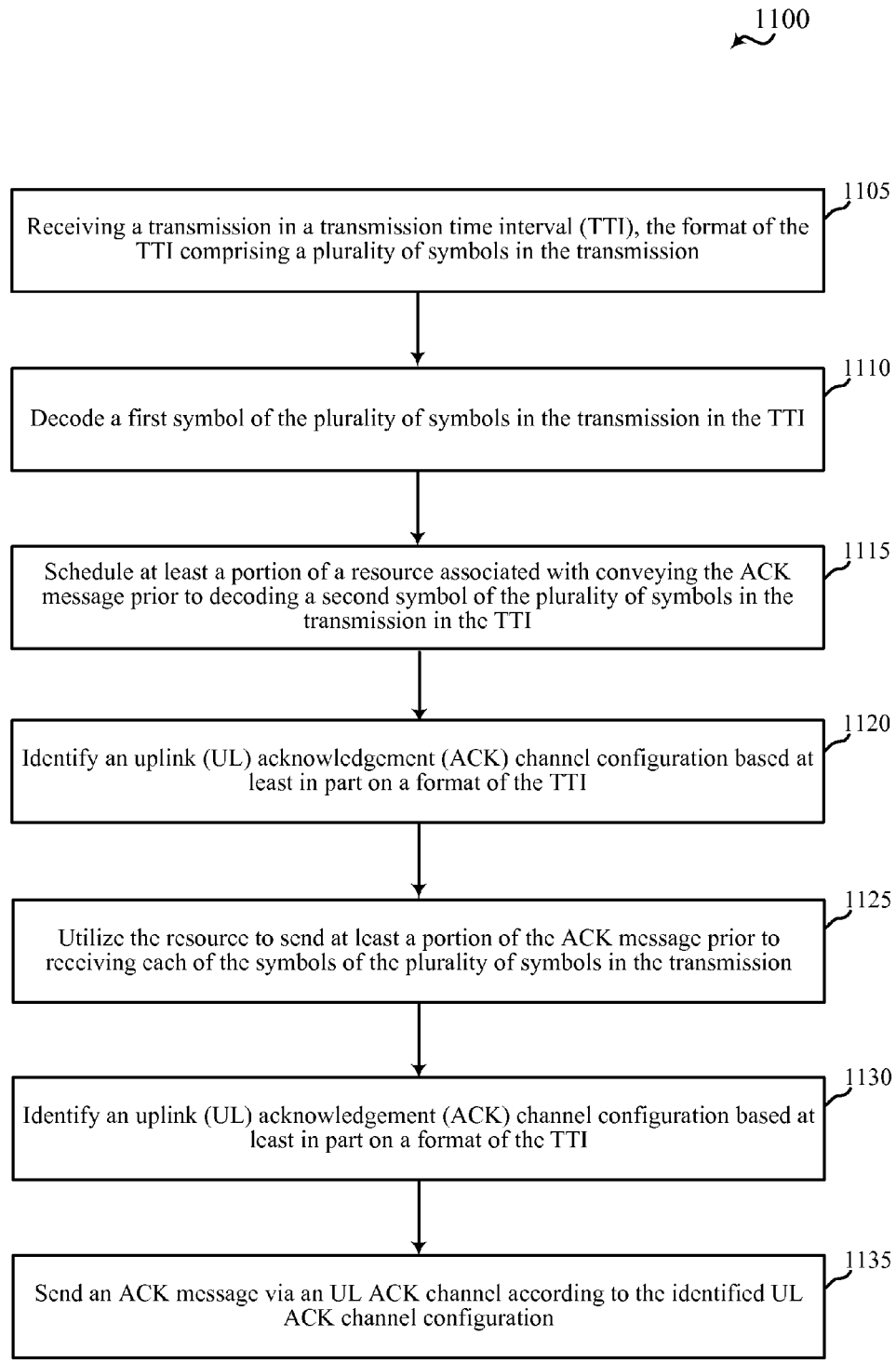
FIG. 11 is a flow chart illustrating another example of a method for wireless communication, in accordance with various aspects of the present disclosure.

FIG. 11 shows a flowchart illustrating a method 1100 for wireless communications, in accordance with various aspects of the present disclosure. The operations of method 1100 may be implemented by a UE 115 or its components, by a base station 105 or its components, and/or by a receiving device or its components, as described with reference to FIGS. 1-9. For example, the operations of method 1100 may be performed by the ACK configuration manager 615 as described with reference to FIGS. 6-9. In some examples, a UE 115 or a base station 105 may execute a set of codes to control the functional elements of the UE 115 or base station 105 to perform the functions described below. Additionally or alternatively, the UE 115 or base station 105 may perform aspects of the functions described below using special-purpose hardware. For convenience, the functions of the method 1100 will be described with reference to a receiving device, such as a UE 115 or a base station 105.

At block 1105, the method 1100 may include a receiving device receiving a transmission in a TTI. The transmission may be received from a sending device. The TTI may have a format that includes a plurality of symbols in the transmission. For example, there may be 2, 3, 4, etc., symbols in the transmission in the TTI.

At block 1110, the method 1100 may include the receiving device decoding a first symbol of the plurality of symbols in the transmission in the TTI. For example, the receiving device may decode the first symbol prior to receiving and/or decoding the second, third, etc., symbols in the transmission. Based on decoding the first symbol, the receiving device may determine that the transmission is addressed to the receiving device and that acknowledgement reporting is expected.

At block 1115, the method 1100 may include the receiving device scheduling at least a portion of a resource associated with conveying the ACK message prior to decoding a second symbol of the plurality of symbols in the transmission in the TTI. For example, the receiving device may schedule one or more symbols to convey, as components of the ACK message, pilot information, CSF information, ACK information, and the like.

At block 1120, the method 1100 may include the receiving device using the resource to send at least a portion of the ACK message prior to receiving each of the symbols of the plurality of symbols in the transmission. For example, the receiving device may use the scheduled resource to send the pilot information, the CSF information, or a combination pilot/CSF information.

At block 1125, the method 1100 may include the receiving device identifying an UL ACK channel configuration based at least in part on the format of the TTI, e.g., the multiple symbols in the transmission in the TTI. For example, the UL ACK channel configuration may include selecting a wideband waveform signal for acknowledgement reporting and/or a multi-symbol per TTI design that leverages the available symbols per TTI to get a head start on the acknowledgement reporting procedure, e.g., scheduling resources while still receiving the transmission.

At block 1130, the method 1100 may include the receiving device sending an ACK message via the UL ACK channel according to the UL ACK channel configuration. For example, the ACK message may be sent in a wideband waveform signal that may include one or more symbols conveying ACK information, pilot information, CSF information, and the like.

The operation(s) at block 1105, 1110, 1115, 1120, 1125, and/or 1130 may be performed using the ACK configuration manager 615 described with reference to FIGS. 6-9.

Thus, the method 1100 may provide for wireless communication. It should be noted that the method 1100 is just one implementation and that the operations of the method 1100 may be rearranged or otherwise modified such that other implementations are possible.

Figure 12:
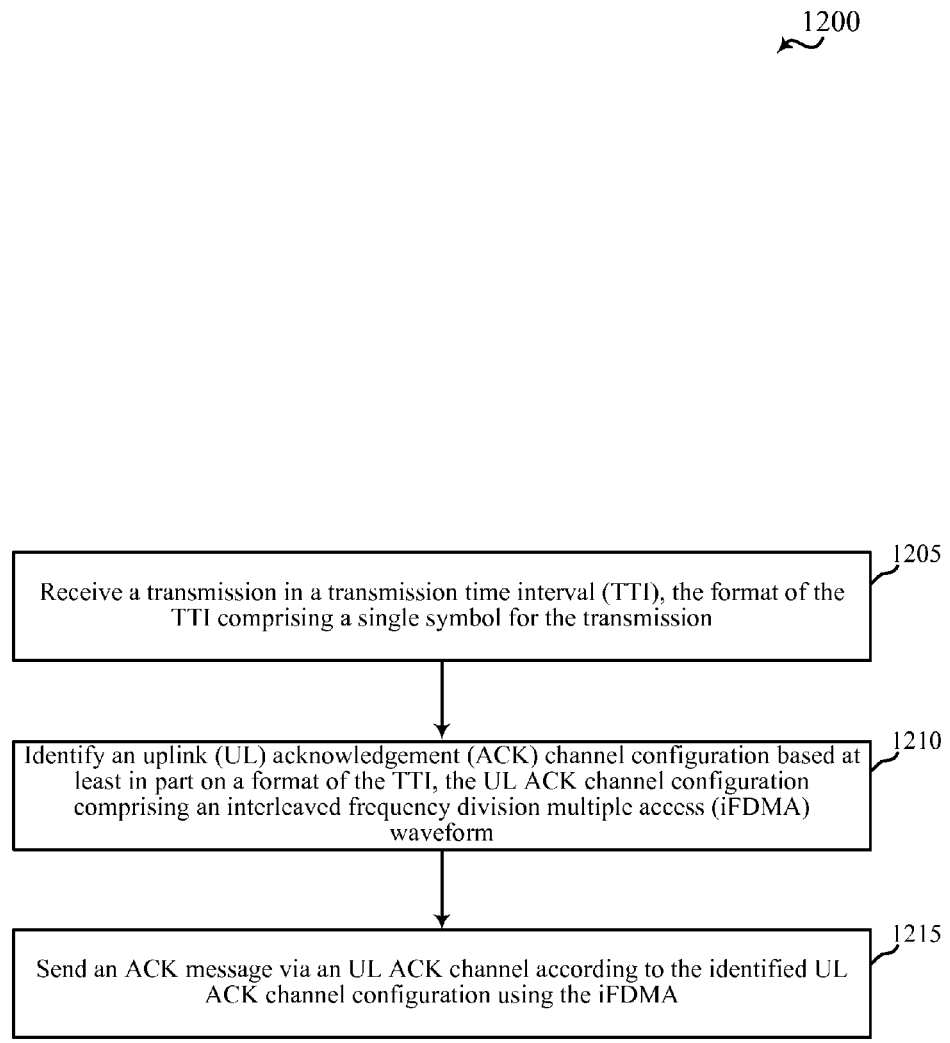
FIG. 12 is a flow chart illustrating another example of a method for wireless communication, in accordance with various aspects of the present disclosure.

FIG. 12 shows a flowchart illustrating a method 1200 for wireless communications, in accordance with various aspects of the present disclosure. The operations of method 1200 may be implemented by a UE 115 or its components, by a base station 105 or its components, and/or by a receiving device or its components, as described with reference to FIGS. 1-9. For example, the operations of method 1200 may be performed by the ACK configuration manager 615 as described with reference to FIGS. 6-9. In some examples, a UE 115 or a base station 105 may execute a set of codes to control the functional elements of the UE 115 or base station 105 to perform the functions described below. Additionally or alternatively, the UE 115 or base station 105 may perform aspects of the functions described below using special-purpose hardware. For convenience, the functions of the method 1200 will be described with reference to a receiving device, such as a UE 115 or a base station 105.

At block 1205, the method 1200 may include a receiving device receiving a transmission in a TTI. The transmission may be received from a sending device. The TTI may have a format including one symbol in the transmission.

At block 1210, the method 1200 may include the receiving device identifying an UL ACK channel configuration based at least in part on the format of the TTI. For example, the UL ACK channel configuration may include selecting a wideband waveform signal for acknowledgement reporting. In some examples, the wideband waveform signal may include an iFDMA waveform signal with a set number of non-zero tones per available tones, e.g., 4 non-zero tones per 16 tones.

At block 1215, the method 1200 may include the receiving device sending an ACK message via the UL ACK channel according to the UL ACK channel configuration. For example, the ACK message may be sent in the wideband waveform signal conveying ACK information, pilot information, CSF information, and the like. The ACK message may be spread across multiple tones of the wideband signal to achieve frequency diversity and reliability.

The operation(s) at block 1205, 1210, and/or 1215 may be performed using the ACK configuration manager 615 described with reference to FIGS. 6-9.

Thus, the method 1200 may provide for wireless communication. It should be noted that the method 1200 is just one implementation and that the operations of the method 1200 may be rearranged or otherwise modified such that other implementations are possible.

In some examples, aspects from two or more of the methods 1000-1200 may be combined. It should be noted that the methods 1000, etc. are just example implementations, and that the operations of the methods 1000-1200 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving a transmission in a transmission time interval (TTI);
   identifying an uplink (UL) acknowledgement (ACK) channel configuration based at least in part on a format of the TTI, wherein the UL ACK channel configuration includes at least an interleaved frequency division multiple access (iFDMA) waveform; and
   sending an ACK message via an UL ACK channel according to the identified UL ACK channel configuration.

2. The method of claim 1, wherein the format of the TTI comprises a plurality of symbols for the transmission.

3. The method of claim 2, further comprising:
   decoding a first symbol of the plurality of symbols in the transmission in the TTI; and
   scheduling at least a portion of a resource associated with conveying the ACK message prior to decoding a second symbol of the plurality of symbols in the transmission in the TTI.

4. The method of claim 3, further comprising:
   utilizing the resource to send at least a portion of the ACK message prior to receiving each of the symbols of the plurality of symbols in the transmission.

5. The method of claim 4, wherein the portion of the ACK message comprises at least pilot information, or channel space feedback information, or ACK/negative ACK (ACK/NACK) information, or a combination thereof.

6. The method of claim 2, further comprising:
   sending the ACK message in more than one symbol in a subsequent TTI.

7. The method of claim 2, further comprising:
   determining that the transmission in the TTI is associated with a high priority communication.

8. The method of claim 1, wherein the format of the TTI comprises one symbol.

9. The method of claim 8, further comprising:
   identifying a communication metric associated with the ACK message; and
   selecting a non-zero tone value for the iFDMA waveform based at least in part on the communication metric, the non-zero tone value corresponding to a number of non-zero tones within a predetermined number of tones of the iFDMA waveform.

10. The method of claim 9, wherein the iFDMA waveform is multiplexed with one or more other iFDMA waveforms to capture orthogonality and spectrum efficiency.

11. The method of claim 9, wherein the communication metric comprises at least a latency attribute associated with the ACK message, or a frequency diversity attribute associated with the ACK message, or a peak to average power ratio (PAPR) attribute associated with the ACK message, or a combination thereof.

12. The method of claim 8, further comprising:
    determining that the transmission received in the TTI is associated with a high priority communication.

13. An apparatus for wireless communication, comprising:
    a processor;
    memory in electronic communication with the processor; and
    instructions stored in the memory, the instructions being executable by the processor to: receive a transmission in a transmission time interval (TTI);
    identify an uplink (UL) acknowledgement (ACK) channel configuration based at least in part on a format of the TTI, wherein the UL ACK channel configuration includes at least an interleaved frequency division multiple access (iFDMA) waveform; and
    send an ACK message via an UL ACK channel according to the identified UL ACK channel configuration.

14. The apparatus of claim 13, wherein the format of the TTI comprises a plurality of symbols for the transmission.

15. The apparatus of claim 14, further comprising instructions executable by the processor to:
    decode a first symbol of the plurality of symbols in the transmission in the TTI; and schedule at least a portion of a resource associated with conveying the ACK message prior to decoding a second symbol of the plurality of symbols in the transmission in the TTI.

16. The apparatus of claim 15, further comprising instructions executable by the processor to:
utilize the resource to send at least a portion of the ACK message prior to receiving each of the symbols of the plurality of symbols in the transmission.

17. The apparatus of claim 16, wherein the portion of the ACK message comprises at least pilot information, or channel space feedback information, or ACK/negative ACK (ACK/NACK) information, or a combination thereof.

18. The apparatus of claim 14, further comprising instructions executable by the processor to:
send the ACK message in more than one symbol in a subsequent TTI.

19. The apparatus of claim 14, further comprising instructions executable by the processor to:
determine that the transmission in the TTI is associated with a high priority communication.

20. The apparatus of claim 13, wherein the format of the TTI comprises one symbol.

21. The apparatus of claim 20, further comprising instructions executable by the processor to:
identify a communication metric associated with the ACK message; and
select a non-zero tone value for the iFDMA waveform based at least in part on the communication metric, the non-zero tone value corresponding to a number of non-zero tones within a predetermined number of tones of the iFDMA waveform.

22. The apparatus of claim 21, wherein the iFDMA waveform is multiplexed with one or more other iFDMA waveforms to capture orthogonality and spectrum efficiency.

23. The apparatus of claim 21, wherein the communication metric comprises at least a latency attribute associated with the ACK message, or a frequency diversity attribute associated with the ACK message, or a peak to average power ratio (PAPR) attribute associated with the ACK message, or a combination thereof.

24. The apparatus of claim 20, further comprising instructions executable by the processor to:
determine that the transmission received in the TTI is associated with a high priority communication.

25. An apparatus for wireless communication, comprising:
means for receiving a transmission in a transmission time interval (TTI);
means for identifying an uplink (UL) acknowledgement (ACK) channel configuration based at least in part on a format of the TTI, wherein the UL ACK channel configuration includes at least an interleaved frequency division multiple access iFDMA waveform; and
means for sending an ACK message via an UL ACK channel according to the identified UL ACK channel configuration.

26. The apparatus of claim 25, wherein the format of the TTI comprises a plurality of symbols for the transmission.

27. The apparatus of claim 26, further comprising:
means for decoding a first symbol of the plurality of symbols in the transmission in the TTI; and
means for scheduling at least a portion of a resource associated with conveying the ACK message prior to decoding a second symbol of the plurality of symbols in the transmission in the TTI.

28. A non-transitory computer-readable medium storing computer-executable code for wireless communication, the code executable by a processor to:
receive a transmission in a transmission time interval (TTI);
identify an uplink (UL) acknowledgement (ACK) channel configuration based at least in part on a format of the TTI, wherein the UL ACK channel configuration includes at least an interleaved frequency division multiple access (iFDMA) waveform; and
send an ACK message via an UL ACK channel according to the identified UL ACK channel configuration.

* * * * *